(12) United States Patent
Ciaramitaro

(10) Patent No.: US 10,882,142 B2
(45) Date of Patent: Jan. 5, 2021

(54) METHOD FOR SIMPLIFICATION OF COMPLEX WEEDING CONTOURS

(71) Applicant: GroupeSTAHL, Sterling Heights, MI (US)

(72) Inventor: Fred Ciaramitaro, Sterling Heights, MI (US)

(73) Assignee: Stahls' Inc., Sterling Heights, MI (US)

( * ) Notice: Subject to any disclaimer, the term of this patent is extended or adjusted under 35 U.S.C. 154(b) by 194 days.

(21) Appl. No.: 15/947,421

(22) Filed: Apr. 6, 2018

(65) Prior Publication Data

US 2018/0290324 A1 Oct. 11, 2018

Related U.S. Application Data

(60) Provisional application No. 62/482,245, filed on Apr. 6, 2017.

(51) Int. Cl.

| | | |
|---|---|---|
| B23K 26/38 | (2014.01) | |
| B26D 3/28 | (2006.01) | |
| B26D 7/18 | (2006.01) | |
| B26D 3/08 | (2006.01) | |
| G09F 7/16 | (2006.01) | |
| B23K 101/00 | (2006.01) | |
| B23K 103/16 | (2006.01) | |

(52) U.S. Cl.
CPC ............ *B23K 26/38* (2013.01); *B26D 3/085* (2013.01); *B26D 3/281* (2013.01); *B26D 7/1845* (2013.01); *G09F 7/165* (2013.01); *B23K 2101/007* (2018.08); *B23K 2103/166* (2018.08); *B26D 7/1827* (2013.01); *Y10T 428/24322* (2015.01); *Y10T 428/24802* (2015.01)

(58) Field of Classification Search
CPC .... Y10T 428/24802; Y10T 428/24322; B23K 26/38; B23K 2103/166; B23K 2101/007
See application file for complete search history.

(56) References Cited

U.S. PATENT DOCUMENTS

| | | | | |
|---|---|---|---|---|
| 6,491,361 B1 * | 12/2002 | Spann | ....................... | B41J 2/01 347/2 |
| 8,299,387 B2 * | 10/2012 | Stahl | ...................... | B23K 26/38 219/121.44 |

* cited by examiner

*Primary Examiner* — Gerard Higgins
(74) *Attorney, Agent, or Firm* — Harness, Dickey & Pierce, PLC

(57) ABSTRACT

A method of weeding a design in a substrate have a first layer and a second layer is disclosed. The method determines an outline of the design and an inlet portion of the outline. The inlet portion is defined on at least a first and second side by the outline of the design and is open on at least a third side. The method cuts through the first layer but not the second layer along at least a portion of the outline that is not included in the inlet portion. The method also cuts through both the first and second layers along the inlet portion of the outline. The method also cuts through both the first and second layers along a path that closes the third side of the inlet portion.

7 Claims, 11 Drawing Sheets

METHOD FOR SIMPLIFICATION OF COMPLEX WEEDING CONTOURS

CROSS-REFERENCE TO RELATED APPLICATIONS

This application claims the benefit of U.S. Provisional Application No. 62/482,245 filed on Apr. 6, 2017. The entire disclosure of the above application is incorporated herein by reference.

FIELD

The present disclosure relates to a method for simplification of complex weeding contours.

BACKGROUND

This section provides background information related to the present disclosure which is not necessarily prior art.

Removing unwanted material in and around a desired design which has been cut on a multi-layered material including at least two layers and where at least one layer is cut all the way through and at least one layer is not cut all the way through is commonly called "weeding" and is a known term for such in the industry.

Unwanted material in and around a desired design which has been cut on a multi-layered material including at least two layers and where at least one layer is cut all the way through and at least one layer is not cut all the way through is commonly called "scrap".

A multi-layered material may include a "carrier layer", an "adhesive layer", and a "film layer".

Cutting through the film layer and the adhesive layer but not through the carrier layer is commonly called "kiss cutting".

Cutting through the film layer and the adhesive layer and the carrier layer is commonly called "blow through" or "blowing through".

The combination of the film layer and the adhesive layer may be called the "product layer".

Scrap areas within the design contours that are completely surrounded by the desired contour such as the holes in the capital letters "B" "O", and "P" are commonly called "cavities".

Scrap areas within the design contours that intrude into the desired contour but are not completely surrounded by the desired contour will be referred to as "inlets" such as the inlets in the capital letters "H", "N", and "K".

In further example, capital letters such as "A" and "R" have both cavities and inlets. Other characters, including capital letters, lower case letters, numbers, and symbols can have other arrangements of cavities and/or inlets. Different types of fonts can also affect the existence and/or location of cavities and/or inlets for different characters. Besides common characters, various shapes, including abstract shapes for example, can have different arrangements of cavities and/or inlets.

Traditionally, weeding the scrap away from the desired design elements has been a time consuming and laborious process. Most cutting is still performed by using blades or knives and controlling the pressure of the cut tool so that it kiss cuts the design only through the film layer and the adhesive layer.

One problem with this method is that all the scrap that surrounds the desired design must be manually weeded. This includes all the cavities. Each cavity must be removed manually by using specialized hand tools such as tweezers or dental picks.

Another problem with this method is that inlets (Scrap areas within the design contours that intrude into the desired contour but are not completely surrounded by the desired contour), often cause the product layer to tear or break at or within the inlet portions of the design therefore leaving behind small scrap portions of the product layer that need to be manually removed using the same process used for removing cavities.

Weeding away cavities and the scrap portions that remain within inlets is a time consuming and costly process.

Newer cutting technologies such as laser cutting have improved the process of weeding cavities out from the desired design.

By adjusting the power, travel speed, and wavelength of the laser beam, both kiss cutting and blow through cutting can be performed on a single design. Adjusting the laser to kiss cut perimeter design contours and blow through the design's cavities is a known and reasonable method to reduce the time it takes to weed away the scrap. Cavities that are blown all the way through the carrier layer fall away into a collection bin and are no longer needed to be removed by hand during the weeding process.

Even though using a laser is favorable, the problem still exists with small scrap portions of the product layer still tearing or breaking and being left behind within the inlet portions of the design. Thus, there exists room for improvement in the field of weeding.

SUMMARY

This section provides a general summary of the disclosure, and is not a comprehensive disclosure of its full scope or all of its features.

This disclosure describes an improved method for reducing the time it takes to remove unwanted material in and around a desired design which has been cut on a multi-layered material including at least two layers and where at least one layer is cut all the way through and at least one layer is not cut all the way through.

This disclosure describes an embodiment that reduces the production time it takes to weed away all the scrap by converting the inlets of a desired shape and/or size into cavities that can be blown out.

In one form, the present teachings provide for a method of weeding a design in a substrate having a first layer and a second layer. The method can include determining an outline of the design and determining an inlet portion of the outline. The inlet portion can be defined on at least a first side and a second side by the outline and can be open on at least a third side. The method can include cutting through the first layer but not the second layer along at least a portion of the outline that is not included in the inlet portion. The method can include cutting through the first and second layers along the inlet portion of the outline. The method can include cutting through the first and second layers along a path that closes the third side of the inlet portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
FIG. 1 is a top plan view of an example design having multiple design contours.

Example embodiments will now be described more fully with reference to the accompanying drawings.

This disclosure describes a method for weeding that solves the problem of small scrap portions of the product layer still tearing or breaking and being left behind within the inlet portions of the design. The method can include predetermining an inlet portion of a design contour, storing the vector information such as points, splines, lines, and curves that make up the inlet portion, removing the vector contours for the inlet portion from the original design contour, closing the open contour of the original design contour by adding a spline in between its start and end point, retrieving the stored information for the inlet portion, creating a new design contour made up of the stored information, closing the new design contour by adding a spline in between its start and end point, and finally positioning the new design contour in the same position previously occupied by the inlet contour. This can be done for each predetermined inlet portion within the design contour.

Once this is complete, the contours can then be coded with a code system having at least two different identifiers. In the example provided, the contours can be color coded with a color code system having at least two different colors, though other identifiers besides colors can be used. These identifiers (e.g., colors) can relate to the power, travel speed, and other parameters of the laser cutting process. All original design contours can be coded (e.g., color coded) with one identifier (e.g., color) and all new design contours that were generated from the inlet portions can be coded (e.g., color coded) with a different identifier (e.g., a different color).

All contours and identifier (e.g., color) code information can be stored in a computer file such as a .PDF (portable document format) or other format. This file can then be opened in software that operates the cutting equipment such as laser software on a computer connected to the laser cutting equipment, or other processor on or connected to the laser cutting equipment. This software can have or access saved parameters relating to the identifier (e.g., color) coding system. Each identifier (e.g., color) is associated with different parameters relating to the laser's power, travel speed and/or other parameters. In the example provided, an identifier (e.g., color) relating to the original design contours is set to parameters of the laser cutting equipment that result in a kiss cut of those contours. The identifier (e.g., color) relating to the new design contours that are generated from the inlet portions can be set to parameters of the laser cutting equipment that result in a blow through cut of those contours.

Creating new design contours in the inlets and blowing them out can simplify the contours that need to be weeded. This simplification can greatly reduce the time to weed the design, without affecting the relative positioning of separate elements of the design (e.g., separate letters in the design).

Another significant improvement is that with simplified weeding contours of the designs can be automatically weeded by attaching the scrap portion of the design to a roll or core and then attaching the carrier layer containing the design portions to a different roll or core and then separating the scrap from the carrier layer.

This can reduce labor costs since it can be performed without a human doing the weeding.

Additionally, attaching the two different portions to rolls or cores and separating them can provide a more uniform pull tension that is more evenly distributed across the roll or core. This can allow problem materials, such as those that are more brittle or that tear or break easily, to be weeded with efficiency in contrast to them breaking with the uneven pull tension of hand weeding.

Predetermining the Inlet Portions of a Design Contour and Storing the Information:

Predetermining the inlet portions of a design contour can be performed in many ways. One such method is to have an artist review the design contour, identify the inlet, and then perform the steps listed above (e.g., closing the open contour of the original design contour by adding a spline in between its start and end point) to remove the inlet from the design contour and create a new design contour from the inlet portion. The artist can do this for all the design contours in the design. Once this is completed, the artist can store the information in a computer file or series of files that can later be utilized by the cutting software.

One known file format that can store the information is a .TTF (True Type Font), though other formats can be used. Using Font formats for storing the information of original design contours and new design contours can be ideal for designs containing lettering but use of such formats is not limited to just lettering, and can be used for other characters, such as symbols or shapes for example.

An example of using font formats to store and retrieve the information is using one font file to store all the original design contours and a separate font file to store all the new design contours that were created by predetermining the inlet portions of the design contours. By storing the information in at least two separate files, the information can be easily recalled and coded with identifiers (e.g., color coded). One file's information can be coded with one identifier (e.g., color coded one color), and the other file's information can be coded with a different identifier (e.g., color coded with a different color) where the identifiers (e.g., colors) that are used relate to the parameters saved in the cutting software for power, travel speed, wavelength, and other parameters.

This method for predetermining the inlet portions of a design contour and storing the information can be particularly favorable for designs that require lettering since the letters in a design can be easily examined and inlets can be easily predetermined and only need to be done one time (e.g., for the letters in a particular font). After it is completed and the information is stored, the information simply needs to be reused.

Another method for predetermining the inlet portions of a design contour and storing the information can include the use of a mathematical algorithm (e.g., by a computer or other processor). This method can be particularly favorable for design contours that are abstract, such as abstract shapes. One non-limiting example that the mathematical algorithm could predetermine the inlet portions of the original design contour is by creating an ellipse or circle at the starting point of the original design contour, then duplicating that ellipse or circle a predetermined distance away from the previous ellipse or circle along the spline path of the original design contour, then repeating this process until the most recent ellipse or circle returns to the coordinates of the initial ellipse.

Once this is complete, the total number of duplicated ellipses can be analyzed to detect any collisions or intersections. Further analysis of the specific collisions or intersections and their relationship to each other can allow for the identification and therefore predetermination of the inlet portions. The analysis of the collisions or intersections can be based on a number of different factors. These factors can include, without limitation, intersections between non-sequential ellipses, the size and shape of the ellipses and the size, shape, and location of the design contour, for example.

With reference to FIG. 1, an example design 10 is illustrated with multiple design contours. In the example provided, one design contour 14 corresponds to the outline of the letter "H", including all inlets, and another design contour 18 corresponds to the outline of the letter "A", including all inlets and cavities. While only the design contours 14 and 18 are specifically indicated with reference numerals, the other letters illustrated also form design contours. While specific letters and/or arrangements of those letters are illustrated, different letters (including capital or lower case), symbols, shapes, fonts, non-English language characters, or other general characters, can have design contours and be used.

Figure 2:
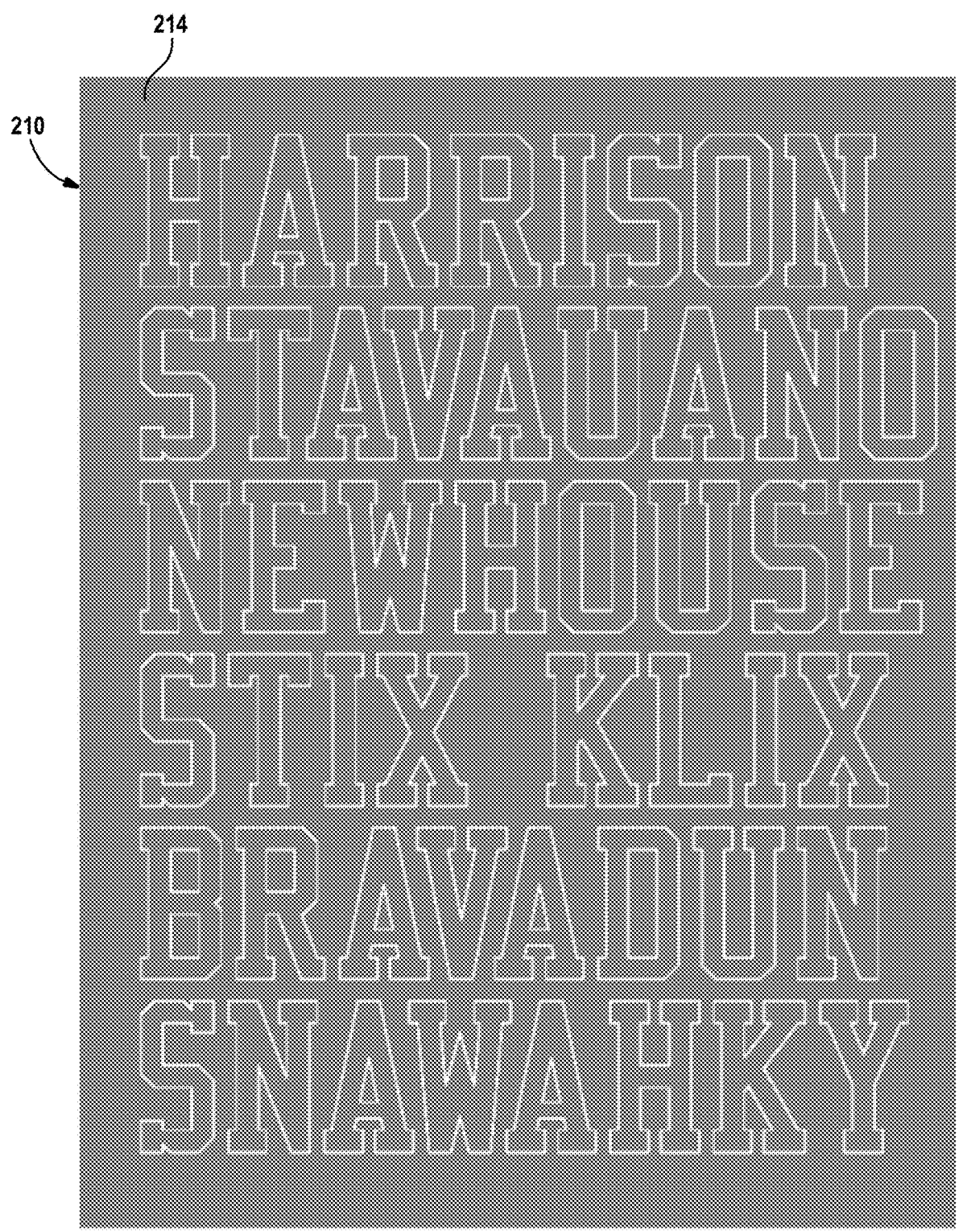
FIG. 2 is a top plan view of the design of FIG. 1, showing the design contours that have been kiss cut using traditional methods on a multi-layer material but before any weeding has been performed to remove the scrap portions.
Figure 3:
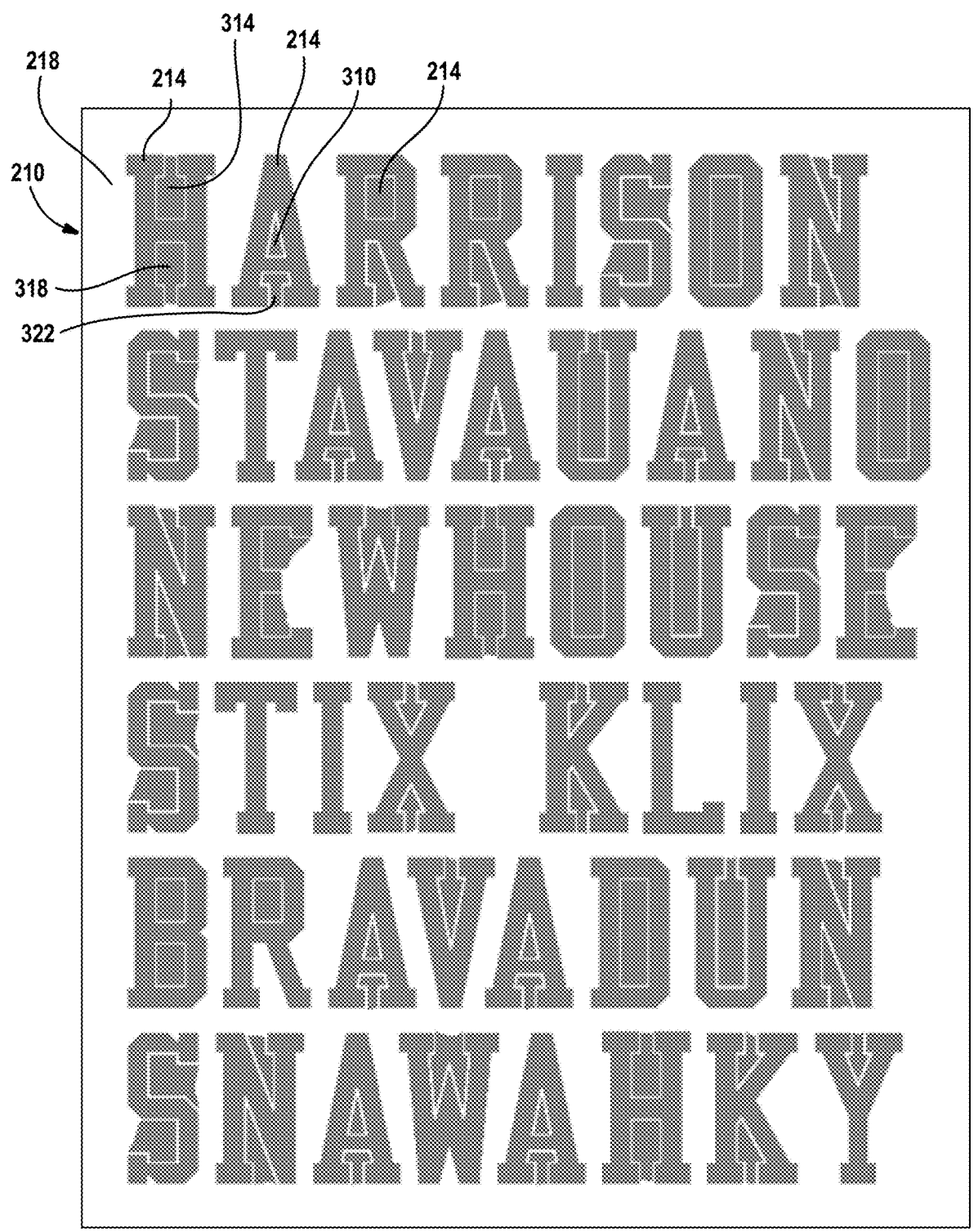
FIG. 3 is a top plan view of the design of FIG. 1, showing the design contours that have been kiss cut using traditional methods on a multi-layer material after the scrap portions have been weeded away, showing the problems with traditional cutting and weeding methods.

With reference to FIGS. 2 and 3, a multi-layer material 210 is illustrated. The multi-layer material can have at least two layers: a product or film layer 214 and a carrier layer 218. In FIG. 2, the design 10 has been kiss-cut (e.g., cut through the film layer 214, but not the carrier layer 218) along the design contours (e.g., design contours 14 and 18, etc.) of the design 10. FIG. 2 illustrates the multi-layer material 210 after a typical kiss-cutting, but before weeding. FIG. 3 illustrates a typical result after the design contours have been kiss-cut using traditional methods and after the scrap portions (e.g., the portions of the film layer 214 that surrounded the design contours) have been weeded away using typical weeding methods. As shown in FIG. 3, cavities (e.g., cavity 310) and inlets (e.g., inlets 314, 318, 322) remain on the carrier 218 layer. The inlets (e.g., inlets 314, 318, 322) typically rip at the opening of the inlet, causing them to remain on the carrier layer 218.

Figure 4:
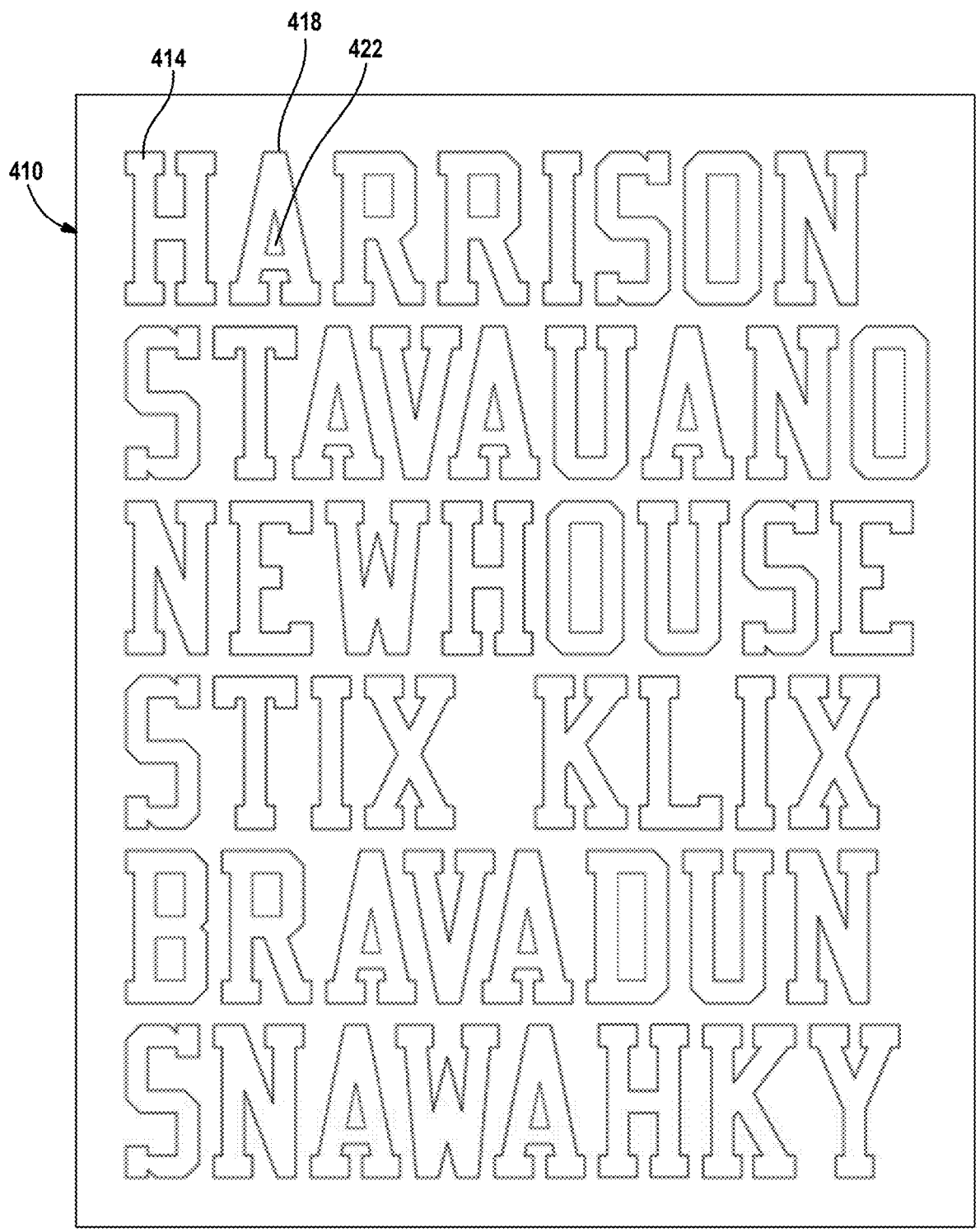
FIG. 4 is a top plan view of the design of FIG. 1, showing the file set up for laser cutting method where the cavities are color coded so that they can be blown out to speed up weeding.

With additional reference to FIG. 4, a design 410 is illustrated for use in a file or input to a laser cutting machine. The design 410 can be similar to the design 10, except as otherwise shown or described herein. The design contours (e.g., design contours 414 and 418) can have their cavities (e.g., outline of cavity 422) coded with an identifier, as described above. In the example provided, the cavities (e.g., outline of cavity 422) are a different color than the rest of the design contour (e.g., design contour 418) for that particular character.

Figure 5:
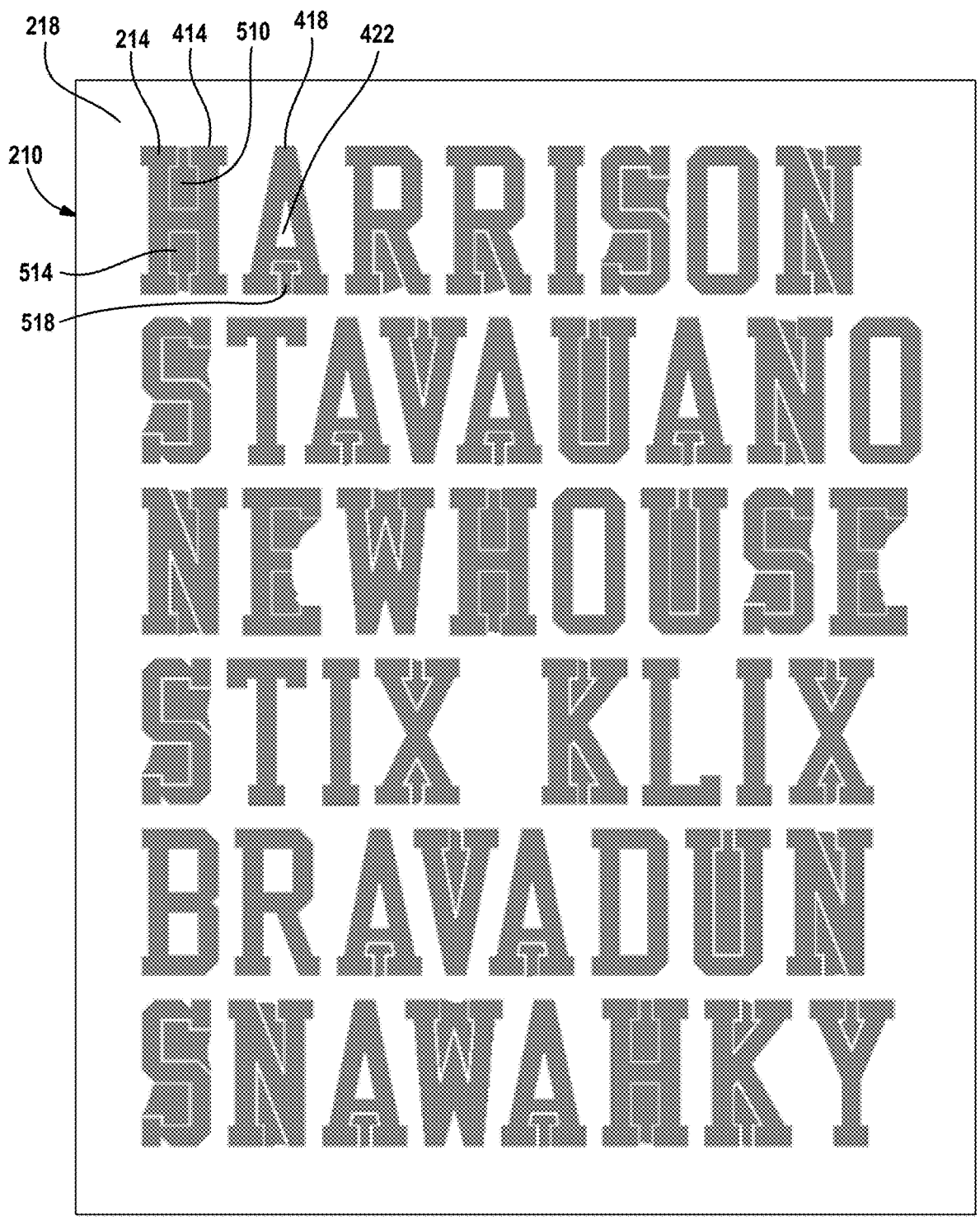
FIG. 5 is a top plan view of the design of FIG. 1, showing the design contours that have been laser cut using traditional methods on a multi-layer material after the scrap portions have been weeded away, showing the problem that scrap still breaks in the inlets.

FIG. 5 illustrates a typical result after laser kiss-cutting along the design contours, laser blow through cutting the cavities, and weeding the scrap portions (e.g., the portions of the film layer 214 that surround the design contours). As shown in FIG. 5, the cavities (e.g., cavity 422) have been removed (e.g., fallen away), but the inlet (e.g., inlets 510, 514, 518) portions of the film layer 214 remain on the carrier layer 218. The inlets (e.g., inlets 510, 514, 518) typically rip at the opening of the inlet, causing them to remain on the carrier layer 218.

Figure 6:
FIG. 6 is a top plan view of the design of FIG. 1, showing the file set up for an improvement to the laser cutting method where the cavities are color coded so that they can be blown out as well as the creation of new design contours generated from the inlet portions of the design.
Figure 7:
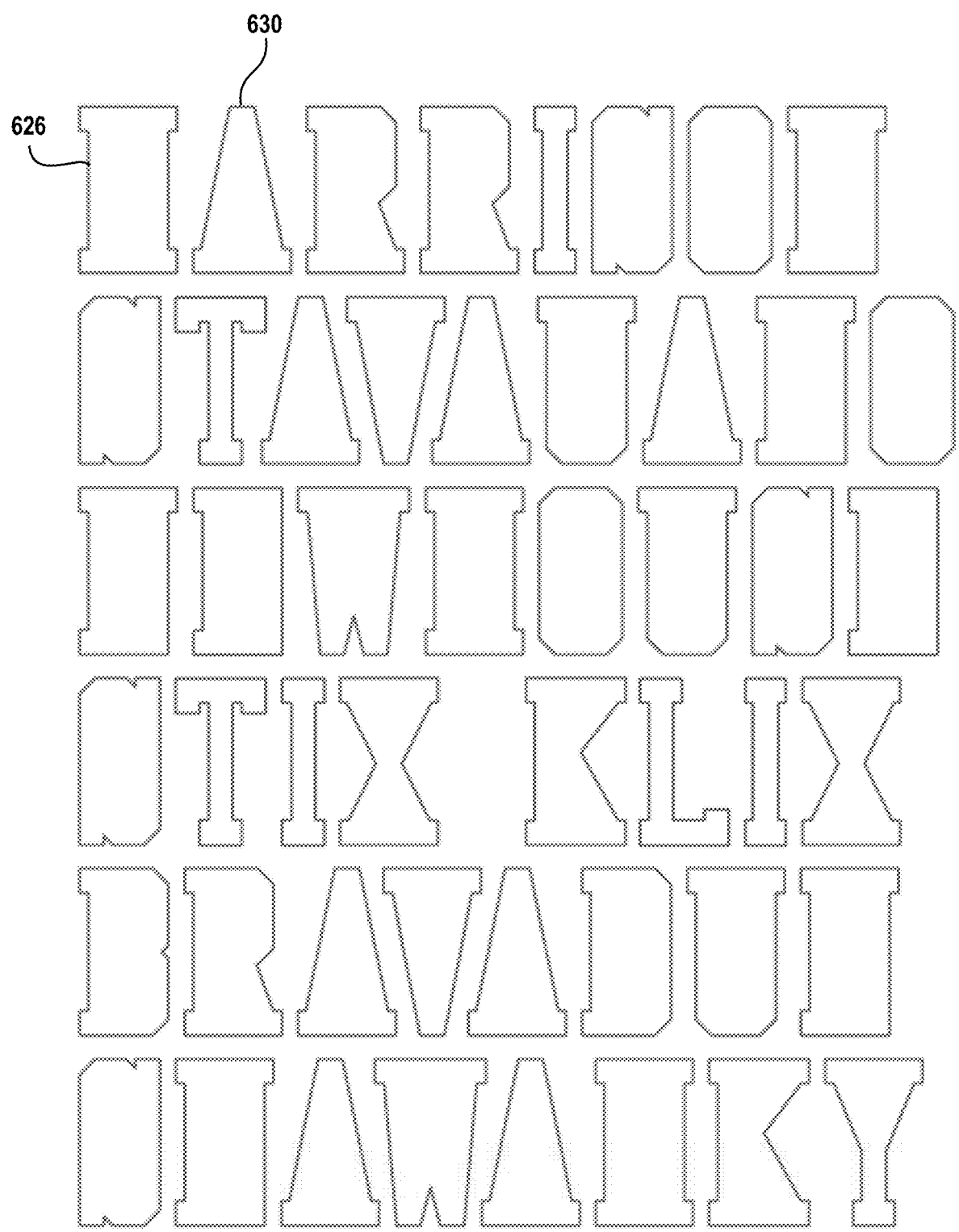
FIG. 7 is a top plan view of a simplified contour of the design of FIG. 1, showing how an embodiment of the invention alters the original design contours to simplify the "weeding contours" or what needs to actually be weeded, and showing one method where the original design contours were stored in a font file and then recalled.
Figure 8:
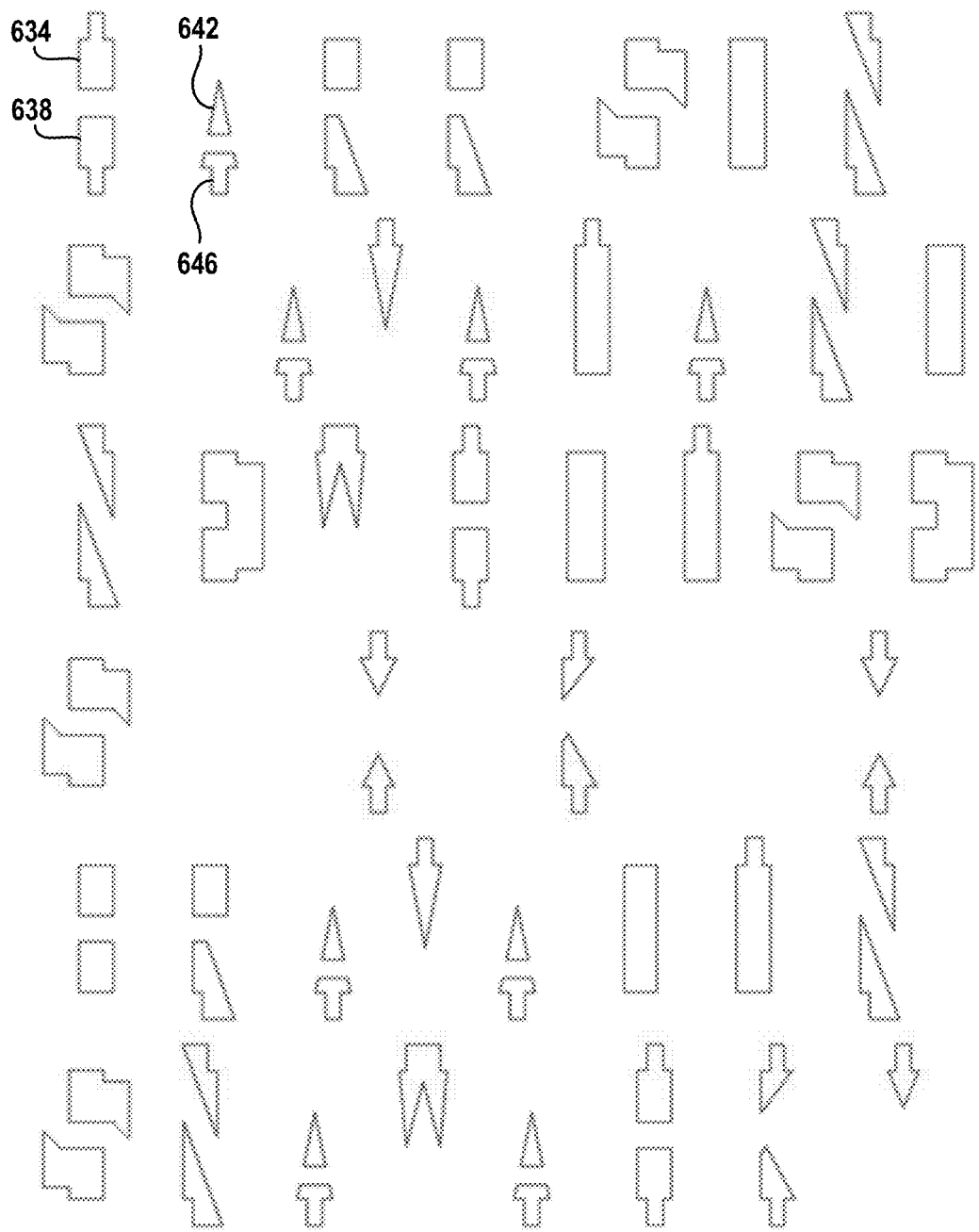
FIG. 8 is a top plan view of blown out areas of the design of FIG. 1, showing how an embodiment of the invention generates new design contours to simplify the "weeding contours" by blowing out inlets and cavities, and showing one method where the new design contours were stored in a font file and then recalled.

With additional reference to FIGS. 6-8, a different design 610, based on the method described above, is illustrated for use in a file or input to a laser cutting machine. The design 610 can be similar to the designs 10 and 410, except as otherwise shown or described herein. The design 610, can include at least one design contour. In the example provided the design 610 includes a plurality of design contours (e.g., design contours 614, 618), which can be similar to the design contours described above except as otherwise shown or described herein.

FIG. 7 shows the portions (e.g., portions 626, 630) of the design contours (e.g., design contours 614, 618) that have an identifier (e.g., color) that corresponds to kiss-cutting, while FIG. 8 shows the portions (e.g., portions 634, 638, 642, 646) of the design contours that have an identifier that corresponds to blow through cutting. As described above, the portions that correspond to blow through cutting can include the cavities, but also the inlets that have been closed by an added spline that connects the start and end of the inlet. Thus, FIG. 7 illustrates how an embodiment of the invention alters the original design contours to simplify the contours that actually need to be weeded from the carrier layer. Similarly, FIG. 8 illustrates how an embodiment of the invention generates new contours to simplify the weeding process by blowing out the inlets along with the cavities.

Figure 9:
FIG. 9 is a top plan view of the design of FIG. 1, showing the results of the laser cutting utilizing the improvements of an embodiment of this invention.

FIG. 9 shows a result after kiss-cutting along the portions shown in FIG. 7 (e.g., portions 626, 630), after blow through cutting along the portions shown in FIG. 8 (e.g., portions 634, 638, 642, 646), and weeding the scrap portions (e.g., the portions of the film layer 214 that surround the design contours). Thus, the film layer 214 only remains on the characters themselves, while the carrier layer 218 can remain around the characters to maintain their relative positions, and the carrier layer 218 and the film layer 214 are removed from the cavities and the inlets. Thus, the cavities and inlets can require no additional weeding.

Figure 10:
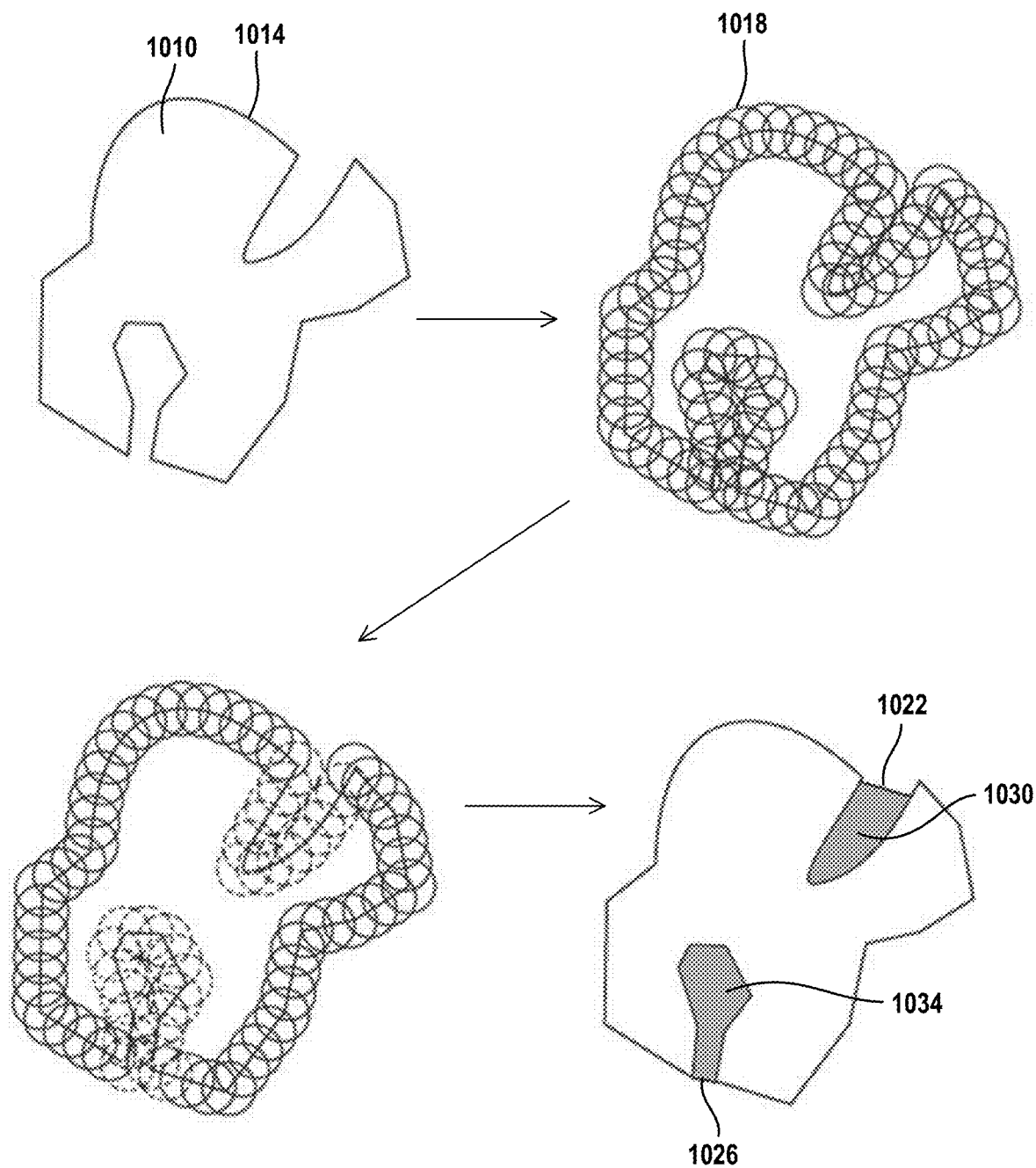
FIG. 10 is a schematic top plan view, showing one method where a mathematical algorithm may be used to automatically identify inlet portions within abstract original design contours.

In the example provided in FIG. 10, an abstract shape 1010 is illustrated in different stages of the inlet portion determination process described above. The shape 1010 can have an outline or original design contour 1014. The ellipses or circles 1018 can then be drawn or otherwise calculated from different points along the original design contour 1014, as described above. Then the collisions or intersections of the ellipses or circles 1018 can be analyzed to identify the start and end of the inlet portions. In the example provided, the ellipses corresponding to the inlet portions are illustrated using dashed lines, though other identifiers (e.g., colors) can be used. Then splines 1022, 1026 can be drawn between the start and end of each inlet portion.

In the example provided, the laser could be configured to blow through cut along the portions of the original design contour 1014 that bound the inlet areas 1030, 1034, and can blow through cut the splines 1022, 1026, but the laser can be configured to kiss-cut the remaining outline of the contour 1014. Thus, when the scrap (e.g., the area surrounding the design contour) is the only part that must be weeded and the inlet areas 1030, 1034 can fall away cleanly without ripping.

Figure 11:
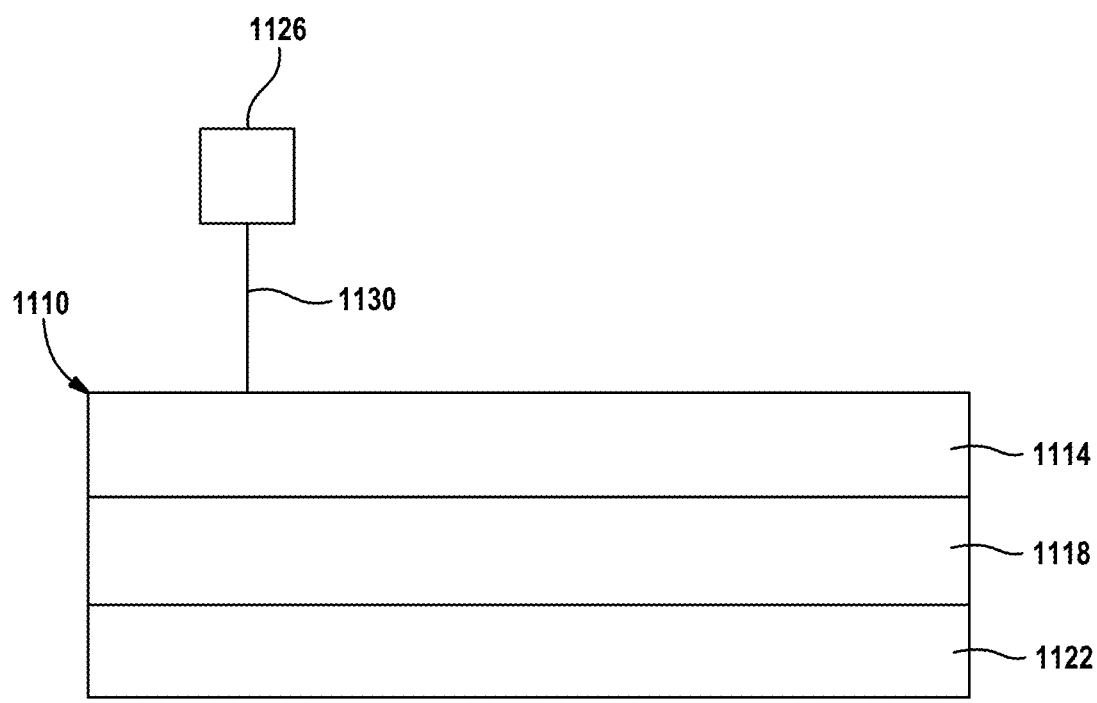
FIG. 11 is a schematic sectional view of a portion of the multi-layer material of FIG. 2.

With additional reference to FIG. 11, a schematic sectional view of the multi-layer material 1110 is illustrated and can be similar to the multi-layer material 210 (FIG. 2). The multi-layer material 1110 can be used in the processes described above. In the example provided, the material 1110 can have an adhesive layer 1114, then a film layer 1118 (e.g., vinyl such as Thermos-FILM® for example), then a carrier layer 1122. A backing layer (not specifically shown) can be above the adhesive layer 1114 to protect the adhesive layer. In an alternative configuration, the adhesive layer 1114 can be omitted, such that only the film layer 1118 and the carrier layer 1122 are included.

Returning to the example provided, a laser 1126 capable of producing a cutting laser beam 1130 is schematically shown as being above the adhesive layer 1114. The laser 1126 can direct the laser beam 1130 at the material 1110 and can be operated in different modes as described above. For example, in the kiss-cut mode, the laser beam 1130 can cut through the adhesive layer 1114 and the film layer 1118, but not the carrier layer 1122, while in the blow through mode, the laser beam 1130 can cut through the adhesive layer 1114, the film layer 1118, and the carrier layer 1122.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A method of making a design element comprising:
   providing a substrate having a design on the substrate, wherein the substrate has at least a first layer and a second layer, and the design has a design contour that defines at least one inlet portion, the inlet portion being partially, but not completely, surrounded by a portion of the design contour;
   cutting through the first layer but not the second layer along at least a portion of the design contour outside of the inlet portion;
   cutting through both the first and second layers along the inlet portion of the design contour; and
   cutting through both the first and second layers along a path on the substrate, separate from the design contour, that, together with the portion cut along the inlet portion of the design contour, encloses the inlet portion.

2. The method of claim 1, wherein the cutting steps are performed by a laser cutting machine.

3. The method of claim 2, wherein the path on the substrate, separate from the design contour, that, together with the portion cut along the inlet portion of the design contour, encloses the inlet portion is determined by calculating a plurality of circles or ellipses along the design contour and analyzing intersections of the circles or ellipses to determine the start and end of the inlet portion of the design contour and calculating data that defines a path that connects the start and end of the inlet portion.

4. The method of claim 1, further comprising generating at least one input data file used to control the cutting steps, the input data file including data defining the design contour and data defining the path on the substrate, separate from the design contour, that, together with the portion cut along the inlet portion of the design contour, encloses the inlet portion.

5. A method of making a design element comprising:
   providing a substrate having a design on the substrate, wherein the design has at at least one inlet portion, and wherein the substrate has at least two layers; comprising:
   generating at least one input data file containing data defining a design contour of the design and data defining at least one spline that is separate from the design contour and that connects the start and end of the inlet portion;
   providing the input data file to laser cutting machine;
   causing the laser cutting machine to cut through a first layer but not a second layer of the at least two layers of the substrate along at least a portion of the design contour outside of an inlet portion;
   causing the laser cutting machine to cut through both the first and second layers of the substrate along the inlet portion of the design contour;
   causing the laser cutting machine to cut through both the first and second layers of the substrate along the spline.

6. The method of claim 5, further comprising causing the laser cutting machine to cut through both the first and second layers of the substrate along a portion of the design contour defining a cavity.

7. The method of claim 5, wherein the data defining the at least one spline is determined by calculating a plurality of circles or ellipses along the design contour and analyzing intersections of the circles or ellipses to determine the start and end of the inlet portion of the design contour and calculating data defining a path that connects the start and end of the inlet portion of the design contour.

* * * * *